United States Patent [19]

Beranger et al.

[11] 3,950,197
[45] Apr. 13, 1976

[54] METHOD FOR MAKING A SUBSTANTIALLY PLANAR STRUCTURE CONSTITUTED BY JOINTED BUILDING ELEMENTS

[75] Inventors: Jean Beranger, Massy; Pierre Perrin, Pont Ste Marie, both of France

[73] Assignee: La Vermiculite et la Perlite S.A., Nanterre, France

[22] Filed: July 8, 1974

[21] Appl. No.: 486,672

[30] Foreign Application Priority Data
July 11, 1973 France .............................. 73.25357

[52] U.S. Cl. ..................... 428/311; 9/400; 61/1 R; 156/71; 156/250; 156/245; 156/304; 264/46.5; 264/46.9; 264/54; 264/298; 428/167; 428/315
[51] Int. Cl.² ........................................ B32B 31/20
[58] Field of Search ....... 161/36, 37, 119, 121, 123; 264/46.4, 46.5, 46.9, 45.1, 54, 298; 61/1; 156/71, 79, 304, 245, 250; 9/400; 428/167, 311, 315

[56] References Cited
UNITED STATES PATENTS

| | | | |
|---|---|---|---|
| 2,744,847 | 5/1956 | Orr | 161/119 |
| 2,910,381 | 10/1959 | Vogel | 117/DIG. 7 |
| 3,036,342 | 5/1962 | Fino | 264/46.5 |
| 3,306,959 | 2/1967 | Berner | 264/46.5 |
| 3,802,010 | 4/1974 | Smith | 156/304 |

Primary Examiner—Edward G. Whitby
Attorney, Agent, or Firm—Merchant, Gould, Smith, Edell Welter & Schmidt

[57] ABSTRACT

The present invention is related to a method for manufacturing a substantially planar and horizontal rigid structure constituted by building elements which are jointed to each other, comprising the steps of successively moulding said building elements from a rapidly polymerizing foamed plastic material; transferring successively said building elements, immediately after polymerization of said plastic material to a predetermined location in the structure to be obtained, so as place each one of said elements into a juxtaposition with respect to the previously transferred element, said transferring step being carried out preferably after a modification of at least a portion of the surface of said elements; and jointing to said predetermined location to the element which has previously been transferred.

9 Claims, 3 Drawing Figures

METHOD FOR MAKING A SUBSTANTIALLY PLANAR STRUCTURE CONSTITUTED BY JOINTED BUILDING ELEMENTS

The instant invention is related to a method for making a substantially planar and horizontal rigid structure constituted by building elements jointed to each other. The invention is also related to an installation for carrying out the aforementioned method, as well as to the structure obtained thereby.

It is well known that when carrying out known methods of the kind indicated hereinabove, it is possible to use building elements made of moulded concrete, said elements being juxtaposed, i.e. placed side-by-side, after the setting or hardening of the moulded concrete elements, whereafter the latter are jointed to each other.

Other know methods make use of pre-manufactured metallic building elements which are conveniently positioned with respect to each other and then jointed, such as by welding, riveting, or the like.

All these known methods have considerable drawbacks, especially due, i.a. to the high weight of the building elements which are used, and to the extensive means which must be used for transporting, handing and jointing said building elements.

The instant invention is aimed at providing a novel method of the kind set forth hereinabove, which overcomes the drawbacks of the methods hitherto known.

More particularly, it is an object of the instant invention to provide a method for making a substantially planar and horizontal rigid structure of the kind considered herein, wherein low-weight building elements are used.

It is another object of the invention to provide a novel method for making a structure of the kind defined hereinabove, which allows the shipping of pre-maufactured building elements from a factory to a construction site to be eliminated.

A further object of the instant invention is to provide a method for making a structure of the above-defined type, wherein the handling and jointing of said building elements is considerably facilitated.

The invention has also for its object to provide an installation which allows the above-mentioned novel method to be carried out in an economical and easy manner.

Yet another object of the invention is to provide a novel structure which can be easily and economically manufactured, while having a considerably reduced weight, as compared to the weight of the known structures of similar type.

Broadly speaking, in accordance with the instant invention a method is provided which comprises the steps of successively moulding the building elements from a rapidly polymerizing foamed plastic material, transferring successively the moulded elements after polymerization to their predetermined location in the definite site of the rigid structure to be obtained, while juxtaposing said successively transferred elements, said transferring step being preferably carried out after modifying the surface configuration of at least a portion of each one of said moulded elements; and bonding immediately each one of said transferred elements to the adjacent element which has been previously transferred to its location in said site.

In a preferred embodiment of the invention said step of moulding said building elements is carried out in situ, i.e. at a location in close proximity to the respective locations of the building elements in the site of the final rigid structure to be manufactured.

Preferably, the above mentioned plastic material is rigid foamed polyurethane.

In accordance with the invention an installation for carrying out the above method comprises a moulding apparatus for successively moulding a plurality of said building elements from a rapidly polymerizing foamed plastic material, transfer means to transfer each one of said elements for bringing it into a position wherein the thus transferred element is in juxtaposed relation with respect to a previously transferred element, and assembling means for jointing the thus juxtaposed elements to each other.

The instant invention allows a rigid structure of the kind considered to be manufactured, while utilizing building elements which not only exhibit outstanding mechanical properties, but furthermore have a very low weight as compared to the weight of the known building elements hitherto used for manufacturing similar structures. Furthermore the instant invention allows any complicated and expensive transportation and handling operation to be practically eliminated.

The instant invention is particularly advantageous in the field of construction of floating tops for covering liquid reserves, such as water, waste water, liquefied gases and the like, which are contained in natural hollows or pits of the ground or in pits which have been artificially prepared. The length of such liquid reserves may be up to about 1 km, and their width may be on the order of up to 100 m, or more.

The invention will now be described with reference to the appended drawings which illustrate several embodiments of the invention by way of example but not of limitation.

FIG. 2 shows diagrammatically an installation for manufacturing a structure such as the one shown in FIG. 1, said structure being adapted to constitute a floating top covering a reservoir defined in a pit or a natural depression and containing a liquid, such as water, waste water, liquefied gas, or the like.

Figure 1:
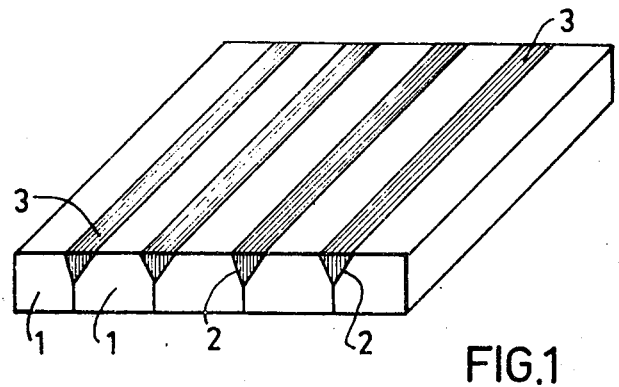
FIG. 1 is a perspective view of a rigid structure according to the present invention.

FIG. 1 shows a substantially planar rigid structure which is constituted by a plurality of building elements 1 made of foamed polyurethane; building elements 1 are obtained by a convenient moulding process using a convenient high pressure moulding machine of a type known per se which allows the dimensions of the moulded elements to be accurately controlled; the building elements thus obtained have a rectangular cross-section or profile. However, prior to jointing these elements to each other in a manner which will be described in more detail hereinbelow, said elements are provided with a bevel along each one of their longitudinal top edges; these bevels are designated by reference numeral 2 on FIG. 1.

Building elements 1 are juxtaposed to each other, i.e. positioned in a side-by-side relation and jointed to each other by introducing into the longitudinal recess defined by any adjacent two bevelled portions 2 a convenient plastic material in the fluid state. This plastic material may be introduced into said recess by pouring or injection, which introducing operation may be carried out by hand or by means of a convenient apparatus of a type known per se. Upon hardening the plastic material thus introduced into said recesses constitutes continuous bonding or welding beads 3. Preferably the welding beads 3 are constituted by the same plastic material as that of building elements 1, and they may comprise reinforcing means.

Figure 2:
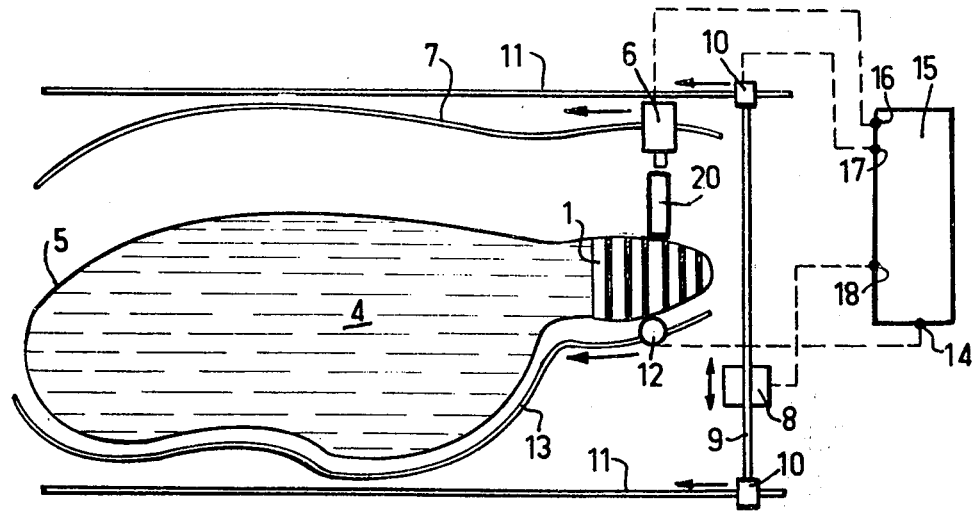

FIG. 2 diagrammatically shows an installation for manufacturing a structure of the type shown in FIG. 1, which structure is adapted to constitute a floating top covering a liquid reserve 4 defined in a pit or natural hollow of the ground, the irregular peripheral border of which is designated by reference numeral 5.

The installation comprises a moulding machine 6 which is displaceably mounted on a guide 7, the latter being substantially parallel to border 5; the machine is located at a convenient distance from border 5 and comprises a mould 20. Said installation further comprises a pouring or injection device 8 displaceable on the crossmember 9 of a portal structure having two carriages 10 which are movable on guides 11, 11'. Guides 11, 11' are parallel to each other and located on respective sides of the pit which contains the liquid reserve 4. A sensing device 12 is movable on a guide 13 which is arranged on the opposite side of the liquid reserve 4, with respect to the location of guide 7. Sensing device 12 is connected to the input of a control device 15 the outputs 16, 17, 18 of which are connected, respectively, to the moulding machine 6, the actuating device associated with carriages 10 and the injection device 8.

The above-described installation operates in the manner set forth hereinafter.

Moulding machine 6 produces a first building element 1 the plastic material of which polymerizes immediately due to the fast polymerizing properties of the particular foamed plastic material which is used; this first building element covers the right hand end (as shown in FIG. 2) of the liquid reserve 4. It has been stated herein above that moulding machine 6 is located at a convenient distance from border 5 of the pit containing the liquid reserve. This means that the distance between the moulding machine 6 and the border 5 is sufficiently great for allowing for complete polymerization of the foamed plastic material when the leading end of the moulded building element reaches the border 5, said building element having consequently taken at this moment is definite shape. This distance is on the order of 10 to 20 m and preferably about 15 m when the moulding rate is about 1 m/min. and when the time interval necessary for polymerization is less than 2 minutes. Through control device 15 the sensing device 12 causes moulding machine 6 to stop when the moulded building element has the desired length, which length is determined by sensing device 12. Indeed, sensing device 12 measures the length of the building element, taking into account the distance between the guide 13 and the border of pit 4, as well as the distance between moulding machine 6 and said border. A severing device (not shown) associated with moulding machine 6 cuts off each building element 1 to the desired length, and a bevelling device (not shown) shapes the bevelled portions 2 shown in FIG. 1.

Due to a pre-established program of control device 15, the latter then causes the moulding machine 6 to move on guide 7; control device 15 furthermore causes sensing device 12 to move on its guide 13, and it also causes moulding machine 6 to be started again to produce the next building element 1 the length of which is also determined by the operation of the sensing device as described hereinabove. Substantially at the same time the control device 15 monitored by sensing device 12 causes portal structure 9, 10 to be brought to a convenient location, and injection device 8 to be moved along cross member 9 of the portal structure; control device 15 furthermore causes said injection device 8 to be re-started whereby plastic material is introduced by injection device 8 into the recess defined by the adjacent bevel portions of the two juxtaposed building elements 1 with a view to jointing said elements to each other. If desired, reinforcing elements may be introduced into the recess defined by the bevelled portions prior to introducing the plastic material into said recess; such reinforcing elements may be metallic elements, or elements made of plastic material.

The above-described operating cycle is repeated until the entire surface of the liquid reserve 4 is covered by a rigid structure constituted by juxtaposed building elements 1 jointed to each other by bonding beads 3.

Figure 3:
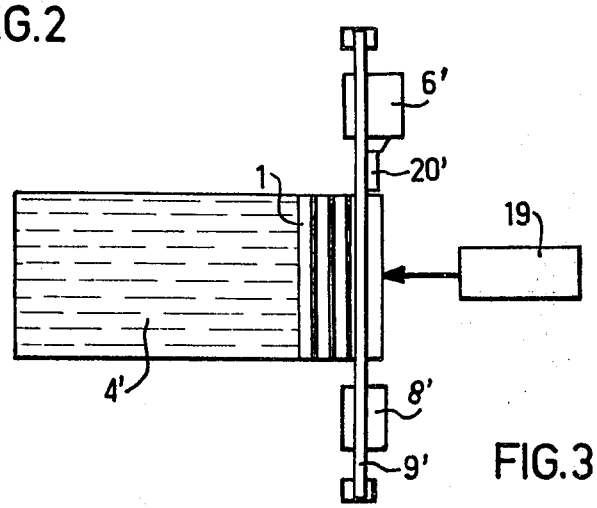
FIG. 3 is a diagrammatic view of another embodiment of the installation according to the invention, wherein the rigid structure to be manufactured is adapted to constitute a floating top covering a reservoir of rectangular shape.

The installation according to the embodiment shown in FIG. 3 is adapted to produce a floating top for covering a rectangularly shaped liquid reserve 4'. This installation comprises a stationary moulding machine 6', a mould 20' for receiving plastic material and shaping the same into building elements, and a stationary portal structure 9' supporting a movably mounted injection device 8' on the cross member of said portal structure. Building elements 1 which are of equal length are thus moulded, cut to the desired length by a severing device (not shown), bevelled and jointed by introduction of liquid plastic material into the bevelled recess, all these operations being carried out at the same location. As the moulding and jointing or assembling of the building elements proceeds, the latter are displaced step by step by a conveying or pushing device 19 which may comprise, for instance, one or more hydraulic jacks or similar implements.

A plastic material preferably used for the moulding of building elements 1 end, if desired, for their jointing together by means of welding beads 3 is rigid foamed polyurethaane having less than 20% of open cells. Such rigid foamed plastic material may be obtained by the reaction of a polyol such as a polyether, a polyester, or mixtures thereof, comprising free oxydriles, with an isocyanate in the presence of foaming agents and catalysers.

The polyol advantageously has an OH index higher than 150; it is preferred to use a polyol having OH index higher than 180.

The above-mentioned isocyanate is preferably dimethyl methane di-isocyanate; however any isocyanate may be used; it is also possible to use a pre-polymer resulting from a pre-reaction of an isocyanate and a polyol. Advantageously 80 to 150 parts of isocyanate per 100 parts of polyol are used; in a preferred embodiment this proportion is more than 85 parts of isocyanate per 100 parts of polyol.

The foaming agent is a substance having a boiling point comprised between 30° and 50°C, which vaporises under the exothermique action of the reaction, or is dissociated to produce a gas thereby to cause the expansion of the plastic material. Typical examples of such foaming agents are trichlorofluoromethane and a mixture of trichlorofluoromethane with dichlorofluoromethane.

Preferable 5 to 10 parts of foaming agent per 100 parts of polyol are used when carrying out the instant method.

The catalyser is constituted by a tertiary amine such as triethylamine, dimethylbutylamine, triethanolamine, which may be mixed with tin salts such as tin dibutyldilaurate, tin dibutyldietylhexoate, tin dibutyldicaraboxylate, tin dibutyldiacetate, tin octoate, or tin oleate.

Preferably 0.5 to 3 parts of catalyser per 100 parts of polyol are used.

The resulting rigid foamed polyurethane comprises less than 20 percent of open cells; its density is higher than or equal to 27kg/m$^3$, and the foamed polyurethane material is impervious to gases and to water.

What is claimed is:

1. A method for manufacturing a floating roof for covering a liquid reserve, comprising the steps of:
   moulding at the site of the liquid reserve a successive of substantially parallelepipedic elongated building elements from a rapidly polymerizable foamed plastic material;
   moving each one of said moulded elements, as it issues from said mould, over said liquid reserve, in such a way that it is juxtaposed to the previously moulded element on top of said liquid reserve; and
   applying a bonding material along the joint between said element and said previous element after the juxtaposition has been accomplished.

2. A method for manufacturing a floating roof for covering a liquid reserve, comprising the steps of:
   providing in the immediate vicinity of said liquid reserve a moulding machine having a mould and adapted to mould successively substantially parallelepipedic elongated building elements from a rapidly polymerizable foamed plastic material;
   moulding successively said parallelepipedic building elements in the immediate vicinity of said liquid reserve;
   cutting each building element to the desired length;
   moving each one of said moulded elements, as it issues from said mould, over said liquid reserve, in such a way that it is juxtaposed to the previously moulded element on top of said liquid reserve;
   providing each moulded element with at least one longitudinal bevelled portion at the upper part of said element so as to define a longitudinal recess between each moulded element and the adjacent juxtaposed element for bonding the same together; and
   introducing a bonding material into each one of the thus defined recesses between the juxtaposed for bonding same together.

3. A method according to claim 2, wherein said moulding machine, each time one of said building elements has been moulded and moved over said liquid reserve, is moved to a new position adjacent to its previous position wherein the subsequent moulding element is moulded.

4. A method according to claim 2, wherein each time one of said building elements has been moulded and moved over said liquid reserve to be juxtaposed to the previously moulded elements, all the juxtaposed moulded elements are displaced with respect to the moulding machine prior to moulding the subsequent element.

5. A method according to claim 2, wherein a reinforcing material is introduced into said recesses prior to introducing therein said bonding material.

6. A method according to claim 2, wherein said step of providing each moulded element with at least one longitudinal bevelled portion is carried out in such a manner that said longitudinal recess defined thereby between any two adjacent juxtaposed moulded elements has a substantially V-shaped cross-section.

7. A method according to claim 2, wherein said moulded elements are made of foamed polyurethane.

8. A method according to claim 2, wherein said bonding material is polyurethane.

9. A floating roof for a liquid reserve which has been produced by the method claimed in claim 2.

* * * * *